United States Patent
Muerb (10) Patent No.: US 8,636,492 B2
(45) Date of Patent: Jan. 28, 2014

(54) METHOD AND DEVICE FOR GRANULATING THERMOPLASTIC MATERIAL

(75) Inventor: Reinhardt-Karsten Muerb, Aschaffenburg (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 211 days.

(21) Appl. No.: 12/693,882

(22) Filed: Jan. 26, 2010

(65) Prior Publication Data

US 2010/0187707 A1 Jul. 29, 2010

(30) Foreign Application Priority Data

Jan. 26, 2009 (DE) .......................... 10 2009 006 123

(51) Int. Cl.
*B29B 9/06* (2006.01)

(52) U.S. Cl.
USPC ............... 425/67; 425/68; 425/311; 425/313; 425/316; 264/142

(58) Field of Classification Search
USPC ............... 425/67, 68, 311, 313, 316; 264/142
See application file for complete search history.

(56) References Cited

U.S. PATENT DOCUMENTS

| | | | | |
|---|---|---|---|---|
| 3,892,834 A | * | 7/1975 | Pritchard | 264/142 |
| 4,245,972 A | * | 1/1981 | Anders | 425/67 |
| 4,410,306 A | * | 10/1983 | Anders et al. | 425/71 |
| 6,925,741 B2 | * | 8/2005 | Eloo et al. | 425/67 |
| 7,008,203 B2 | * | 3/2006 | Muerb | 425/67 |

FOREIGN PATENT DOCUMENTS

| | | | | |
|---|---|---|---|---|
| DE | 10137524 | * | 2/2003 | B29B 9/06 |
| WO | WO 2006/122340 | * | 11/2006 | B29B 9/06 |

* cited by examiner

*Primary Examiner* — Milton I Cano
*Assistant Examiner* — Jeremiah Smith
(74) *Attorney, Agent, or Firm* — Buskop Law Group, PC; Wendy Buskop (57) ABSTRACT

The methods and apparatuses for granulating thermoplastic material emerging from nozzles in a perforated plate are provided. The apparatus can have a motor-driven cutter arrangement having at least one blade located opposite the perforated plate. The at least one blade can pass over the nozzles in the perforated plate and cuts pellets of the emerging thermoplastic material.

15 Claims, 7 Drawing Sheets

METHOD AND DEVICE FOR GRANULATING THERMOPLASTIC MATERIAL

CROSS REFERENCE TO RELATED APPLICATIONS

The present application claims priority to and the benefit of co-pending German Patent Application No. 10 2009 006 123.1, filed on Jan. 26, 2009, entitled "Method and Device for Granulating Thermoplastic Material". This reference is hereby incorporated in its entirety.

FIELD

The present embodiments generally relate to a method and device for granulating thermoplastic material, such as polyethylene or polypropylene.

BACKGROUND

In general, extruders are frequently used in the granulation of plastics. These extruders press molten plastic raw material through nozzles of a perforated plate into a coolant, e.g. water. In this process, the material emerging through the openings of the nozzles is cut by a cutter arrangement with at least one rotating blade to produce pellets. Corresponding devices, which carry out methods for underwater granulation, are known as underwater granulators such as those made by SPHERO® from the firm Automatik Plastics Machinery GmbH.

The coolant, such as water, which is provided in such underwater granulators for cooling and transporting the freshly cut pellets or granules, is fed to an underwater granulator through an inlet that typically is offset from the axis of rotation of the cutter arrangement and correspondingly offset from the intended axis of symmetry of a housing of such an underwater granulator, and is discharged together with the pellets located therein through an outlet that generally is radially placed. Even though the geometric arrangement and/or dimensioning of such devices, in particular the inlets and outlets and housings of such devices, are chosen such that a certain swirl is imparted to the coolant in the housing of such devices so that it presents less resistance to the rotary motion of the cutter arrangement. Nonetheless, strong eddies and turbulence in the interior of the housing of the produced cutting chamber result from the rotary motion of the cutter arrangement, which has heretofore necessitated a relatively high drive power needed to drive the rotating cutter arrangement.

The aforementioned eddies and turbulence usually arise through the action of the cutter arrangement on the coolant located in this area of the cutter arrangement, since the coolant is accelerated centrifugally by the rotating cutter arrangement. Even at low speeds, the shape, number, and rotary speed of at least one blade have the effect that more cooling fluid is displaced and pumped away from the region of the at least one blade or in the region between multiple blades than the total throughput of cooling fluid in this region.

The cooling fluid that is "missing" in this region is therefore drawn in again from a region in the housing or in the cutting chamber that faces away from the perforated plate and is thus opposite thereto. In this process, the cooling fluid is typically forced into a toroidal path, which is undesirable on account of the high relative speeds and the associated frictional power dissipation in the cooling fluid. This power dissipation must be additionally supplied and compensated for by increased energy input through the drive of the at least one blade of the cutter arrangement.

The German published patent application DE 101 37 524 A1 describes a device for granulating thermoplastic materials emerging from nozzles in a perforated plate, wherein the nozzles, which are provided in a substantially circular arrangement, are swept by blades rotating about a blade carrier shaft. Said blades are held in an inclined position with respect to the radial direction by a blade carrier. The blade carrier shaft extends through the center point of the circular arrangement and a coolant is supplied to the perforated plate and to the blades for cooling and carrying away the pellets thus produced. Here, the blade carrier with blade carrier shaft is arranged in round housing extending to the nozzle plate. A coolant inlet discharge is located in the blade carrier shaft to discharge cooling fluid into the housing in the tangential direction to produce an annular flow. The blade carrier rotates in the housing. The cooling medium rotates in the housing with a speed and rotation direction corresponding to the rotational speed and rotation direction of flow openings in the blade carrier. The cooling medium reaches the blades preferably in an axial direction by way of the flow openings.

The resultant flow of the cooling fluid will be in a spiral running radially from the inside to the outside. The intent with this device is to provide a path for the flow of coolant in the device that allows uniform flow largely free from turbulence.

The document WO 2006/122340 A1 describes a device for granulation in which a cylindrical granulating housing is tightly closed at one end by a perforated plate with nozzle openings. A cooling fluid is supplied via an annular space surrounding the perforated plate, through a plurality of openings axially parallel to the rotational axis of the cutter arrangement. In the process, the cooling fluid washes away the pellets that are thrown radially outward by the separating process, axially parallel to the rotational axis, from the rotation region of the cutter arrangement. The coolant with the pellets contained therein is then discharged through an outlet in the region of the housing facing away from the perforated plate.

Therefore, a need exists for a method and a device for granulating thermoplastic material that allows improved flow control of the coolant and permits energy-efficient granulation in a relatively simple and economical way.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that it can be practiced or carried out in various ways.

The present embodiments relate to one or more methods and a device for granulating thermoplastic material emerging from nozzles in a perforated plate.

In one or more embodiments of the apparatus for granulating thermoplastic material emerging from nozzles in a perforated plate, a motor-driven cutter arrangement that has at least one blade can be located opposite the perforated plate, so that the at least one blade passes over the nozzles in the perforated plate. As such, the at least one blade can cut pellets of the thermoplastic material emerging from one or more of the nozzles. A housing can be adjacent or adjoined to the perforated plate. The housing can enclose at least a portion of the at least one blade of the cutter arrangement. The cutter arrangement can include a blade carrier for holding the at least one blade. The blade carrier can be arranged on a blade shaft.

A coolant can flow through the housing. The coolant can be a cooling fluid, such as water or air. The housing can have an inlet apparatus for the coolant and an outlet for the coolant and the pellets.

One or more embodiments of the method can include introducing the coolant into the housing from the inlet apparatus. The inlet apparatus can include a separate inlet chamber that circumferentially encloses the housing in the area of rotation of the at least one blade and an inlet nozzle arrangement circumferentially extending between the inlet chamber and the housing. The coolant can be circumferentially introduced from all sides radially inward from the outside, which is to say centripetally or radially inward from the outside in a centripetal manner. Accordingly, a centripetal, or at least largely centripetal flow, of the coolant is produced at least in the area of rotation of the at least one blade.

In one or more embodiments of the method a flow rate of coolant that is circumferentially uniform, i.e. remains constant or at least substantially constant over the circumference, is provided by the inlet chamber and the inlet nozzle arrangement. In one or more embodiments of the method, one or more control devices can also be used by themselves or in conjunction with the inlet chamber and inlet nozzle to produce a flow rate of coolant that is circumferentially uniform. The flow rate can be introduced radially from all sides into the area of rotation in the housing, so that the coolant flows inward from the outside.

Accordingly, the coolant or cooling fluid required for cooling and carrying away the freshly cut pellets can be supplied to the housing of the corresponding granulating device in such a manner that it presents as little resistance as possible to the at least one blade of the cutter arrangement. At the same time, the pellets are removed from the rotation area and thus the separating area as quickly as possible.

The coolant can be delivered to the housing through the circumferentially placed inlet nozzle arrangement from the outside to the inside, which is centripetally from the outside to the inside in the area of rotation that is in the region of the cutting plane. According to the invention, this inlet nozzle arrangement is fed through the separate inlet chamber circumferentially extending around the housing.

At least one of the inlet apparatus or the inlet nozzle arrangement, and one or more control devices, can also give the coolant a rotational speed upon entry to the housing or upon entry to the cutting chamber that approximately corresponds to the rotational speed of the at least one blade of the cutter arrangement. The acceleration of the coolant to the desired speed that takes place in this process, i.e., the energy required to reach the corresponding angular momentum, can be obtained from the pressure of the coolant. The additional rotational speed of the coolant can either be mechanically adjusted by means of the design of the inlet nozzle arrangement or mechanically adjusted through controlling the flow rate of the coolant. The rotational speed of the coolant can be matched to various other process parameters such as, material flow rate, type of plastic material to be granulated, size of the pellets, and so on.

Since the coolant can flow into the area of rotation with approximately the same speed as the rotational speed of the at least one blade, it will flow through the at least one blade, or if applicable an intermediate space between multiple blades, of the cutter arrangement and carry the freshly cut pellets out of the area of rotation along with it. As the axis of rotation of the at least one blade of the cutter arrangement is approached, the corresponding rotational speed of the coolant will increase and thus increase the corresponding centrifugal force, so that the inward flow movement from outside becomes progressively more difficult and is ultimately prevented.

As such, the coolant flows into the space behind the at least one blade of the cutter arrangement and flows away from the area of the perforated plate and the area of rotation in the housing in a helical flow.

In one or more embodiments, the angular momentum residing in the coolant can be converted (back) into pressure by the provision of a spiral discharge section for discharge from the housing.

The above described method and apparatus eliminates or reduces the occurrence of energy-consuming toroidal eddies commonly associated with other methods of extruding pellets. This can result in a reduction in the drive power required from the motor that drives the cutter arrangement, and provides an energy-efficient manner of granulating thermoplastic material.

As discussed above, the centripetal or at least substantial centripetal flow of the coolant can be imposed on the coolant that flows into the housing. An additional angular momentum can be oriented to match the direction of rotation of the at least one blade by the shape of the inlet chamber and the inlet nozzle arrangement and/or by one or more control devices in the region of the inlet nozzle arrangement in the area of rotation.

The additional angular momentum can be great enough in size that the corresponding flow rate of the coolant in the direction of rotation of the cutter arrangement is as great as the rotational speed of the cutter arrangement. Consequently, a further optimized flow control of the coolant can be rendered possible in one or more embodiments of the method.

It is also possible for a flow rate and/or a direction of the coolant delivered through the inlet apparatus to be controlled by a control unit such that a direction of the flow of the coolant into the housing is regulated by the control unit. For example, the control unit can have or control one or more control devices as is also explained in detail below in connection with one or more embodiments of the apparatus.

The apparatus for granulating thermoplastic material emerging from nozzles in a perforated plate can have a motor-driven cutter arrangement that has at least one blade. The cutter arrangement can be located opposite the perforated plate, so that the at least one blade passes over the nozzles in the perforated plate and in so doing cuts pellets of the emerging thermoplastic material.

The apparatus can have a housing that adjoins the perforated plate and encloses at least a portion of the at least one blade of the cutter arrangement.

A coolant can flow through the housing. The housing can have an inlet apparatus for the coolant and an outlet for the coolant and the pellets located therein.

The cutter arrangement can have a blade carrier holding the at least one blade, located on a blade shaft and driven by the motor. The inlet apparatus can have a separate inlet chamber, which circumferentially encloses the housing in the area of rotation of the at least one blade.

The inlet apparatus can also have an inlet nozzle arrangement circumferentially extending between the inlet chamber and the housing. In one or more embodiments, the cross-section of the inlet chamber decreases over its circumference in the direction of rotation of the at least one blade, starting from an inlet opening for the coolant in the inlet chamber. Accordingly, the coolant can have a flow rate that is circumferentially uniform through the associated inlet nozzle arrangement. As such, the coolant can flow into the housing, out of the inventively shaped inlet chamber, and through the inlet nozzle arrangement circumferentially from all sides with a uniform flow rate in each area inlet nozzle arrangement across its circumference. A centripetal flow or a flow with a primary centripetal component can be produced. Consequently, the inventive flow optimization can be provided through simple design means as a result of the inventive configuration of the separate inlet chamber.

In one or more embodiments, the inlet chamber or its corresponding cross-sectional profile can be spiral-shaped across its circumference and reduced correspondingly.

The circumferentially placed inlet chamber, with its cross-section decreasing over the circumference, can have any desired basic cross-sectional shape. In principle, the inlet chamber remains constant. For example, a rectangular shape can be used, wherein the radial and/or axial dimensioning of this basic cross-sectional shape decreases accordingly over the circumference, i.e. with increasing wrap angle, preferably decreasing linearly as a function of wrap angle.

In one or more embodiments of the apparatus for granulating thermoplastic material emerging from nozzles in a perforated plate, the apparatus can have a motor-driven cutter arrangement that has at least one blade. The motor-driven cutter arrangement can be operatively aligned with a perforated plate, so that the at least one blade passes over the nozzles in the perforated plate. In so doing, the motor-driven cutter arrangement cuts pellets of the emerging thermoplastic material.

The device can have a housing, which adjoins the perforated plate and encloses the at least one blade of the cutter arrangement, and the coolant can flow through the perforated plate.

The housing can have an inlet apparatus for the coolant and an outlet for the coolant and the pellets located therein. The motor-driven cutter arrangement can have a blade carrier holding at least one blade, located on a blade shaft and driven by the motor.

The inlet apparatus can have a separate inlet chamber, which circumferentially encloses the housing in the area of rotation of the at least one blade, and has an inlet nozzle arrangement circumferentially extending between the inlet chamber and the housing.

One or more control devices can be disposed in the area of the inlet nozzle arrangement. For example, one or more flow control devices can be disposed within the inlet nozzle arrangement. The one or more flow control devices can control the flow rate of the coolant and provide a flow rate that is circumferentially uniform through the inlet nozzle arrangement. Accordingly, the coolant flows into the housing and out of the inventively shaped inlet chamber through the inlet nozzle arrangement circumferentially from all sides with uniform flow rate in each area of the circumference. A centripetal flow or a flow with a primary centripetal component can be produced in accordance with the invention. Consequently, the inventive flow optimization can be provided through simple design means as a result of this inventive configuration of the separate inlet chamber, as well. At least one control device can be placed uniformly over the circumference, such as the same angular separation. The at least one control device can preferably have a blade profile or a vane shape that is hydrodynamically favorable.

The at least one control device provided in accordance with the invention can set the inflowing coolant into rotation such that the rotational speed can be synchronized with the rotational speed of the cutter arrangement. Hence, in addition to the centripetal primary speed component in accordance with the invention, this also applies to a possible additional speed component of the flow of the coolant in the direction of rotation, such as the circumferential direction of the cutter arrangement.

According to one or more embodiments of the apparatus, the one or more control devices can be adjustable such that the circumferentially uniform flow rate of coolant through the inlet nozzle arrangement is adjustable, which is to say that the flow rate is accordingly adjustable over a certain range.

The designs described below relate to embodiments of the apparatus that are applicable for both the embodiment with an inlet chamber designed to have decreasing cross-section in the circumferential direction and/or for the embodiment with one or more control devices arranged in the inlet chamber.

The inlet nozzle arrangement can be an annular gap nozzle that has a nozzle width in the range from 1 mm to 8 mm, from 2 mm to 6 mm, from 2 mm to 4 mm, or from 1 mm to 3 mm. The appropriate nozzle width here can be chosen based on the required flow rate of the coolant and/or the particle size of the pellets to be granulated. The annular gap nozzle here can extend around the entire circumference of the corresponding region of the cutter arrangement, of the housing of the inventive device, or around substantially the entire circumference. If applicable, reinforcing webs, which can additionally improve the dimensional stability of the nozzle gap of such an annular gap nozzle, may be provided in sections.

According to the invention, the inlet nozzle arrangement can also be composed of multiple circumferentially distributed nozzle openings, e.g., gap nozzle openings, each of which has a nozzle width in the range from 1 mm to 8 mm, from 2 mm to 6 mm, from 2 mm to 4 mm, or from 1 mm to 3 mm.

In general, the inlet nozzle arrangement can have a nozzle width that is constant in order to achieve a uniform flow rate of the inflowing coolant over the circumference. The nozzle width may change, for example from smaller to larger or from larger to smaller. As such, the flow properties of the coolant with regard to the speed of flow and flow rate can be influenced in this manner. For example, a larger nozzle width can permit a greater flow volume, and a smaller nozzle width can result in, a higher speed or velocity. However, the larger nozzle width and the smaller nozzle width can have the same flow rate.

The device according to the invention can be designed to be especially flexible with regard to the flow rate of the coolant through the inlet nozzle arrangement in that the inlet nozzle arrangement can be adjustable in its nozzle width.

The nozzle width, which can be selectable, depends in particular on the selected geometry of the granulator, hence on the diameter of the housing, for example. In general, a narrow nozzle width can be used. The narrow nozzle width can be 1 mm or even less. The narrow nozzle width can allow the speed of flow of the coolant through the nozzle arrangement to be increased in comparison to a greater nozzle width. Accordingly, a stronger flow with higher speed of flow can be achieved. When the at least one control device is additionally arranged in the region or in the inlet nozzle arrangement, the nozzle width can be chosen such that sufficient space for these control device(s) can be available, so that undesirable back pressure cannot arise here.

A control unit, by means of which the pressure and/or the flow rate of the coolant supplied through the inlet opening can be controlled, can be provided in accordance with the invention.

For further flow optimization, also in the region of the outlet, the outlet can be located in the region of the housing of the inventive device that faces away from the inlet apparatus. A uniform outflow of the coolant with the pellets contained therein can thus be achieved, by which means possible clumping in the housing, and in particular in the region of the outlet, can additionally be avoided.

The outlet can preferably be placed tangentially extending, i.e., for example tangential to a primary flow of the coolant with the pellets contained therein that may run in the circumferential direction thereto.

For further flow optimization, such as has already been described above, an outlet section shaped in a spiral toward the outlet for the coolant and the pellets contained therein can be arranged in the region of the housing that faces away from the inlet apparatus. In this way, a pressure build-up (refer to description further above) in the outlet region of the device for the coolant and the pellets contained therein can be achieved by simple design means.

For further flow optimization, an outlet section shaped in a helix toward the outlet for the coolant and the pellets contained therein can also be arranged in the region of the housing that faces away from the inlet apparatus. In this way as well, a pressure build-up (refer to description further above) in the outlet region of the device for the coolant and the pellets contained therein can be achieved by simple design means.

In general, the features and advantages cited with regard to the embodiments of the method also apply to the embodiments of the device and vice versa insofar as applicable, wherein any desired combinations of the cited features to the extent useful are possible.

Figure 1:
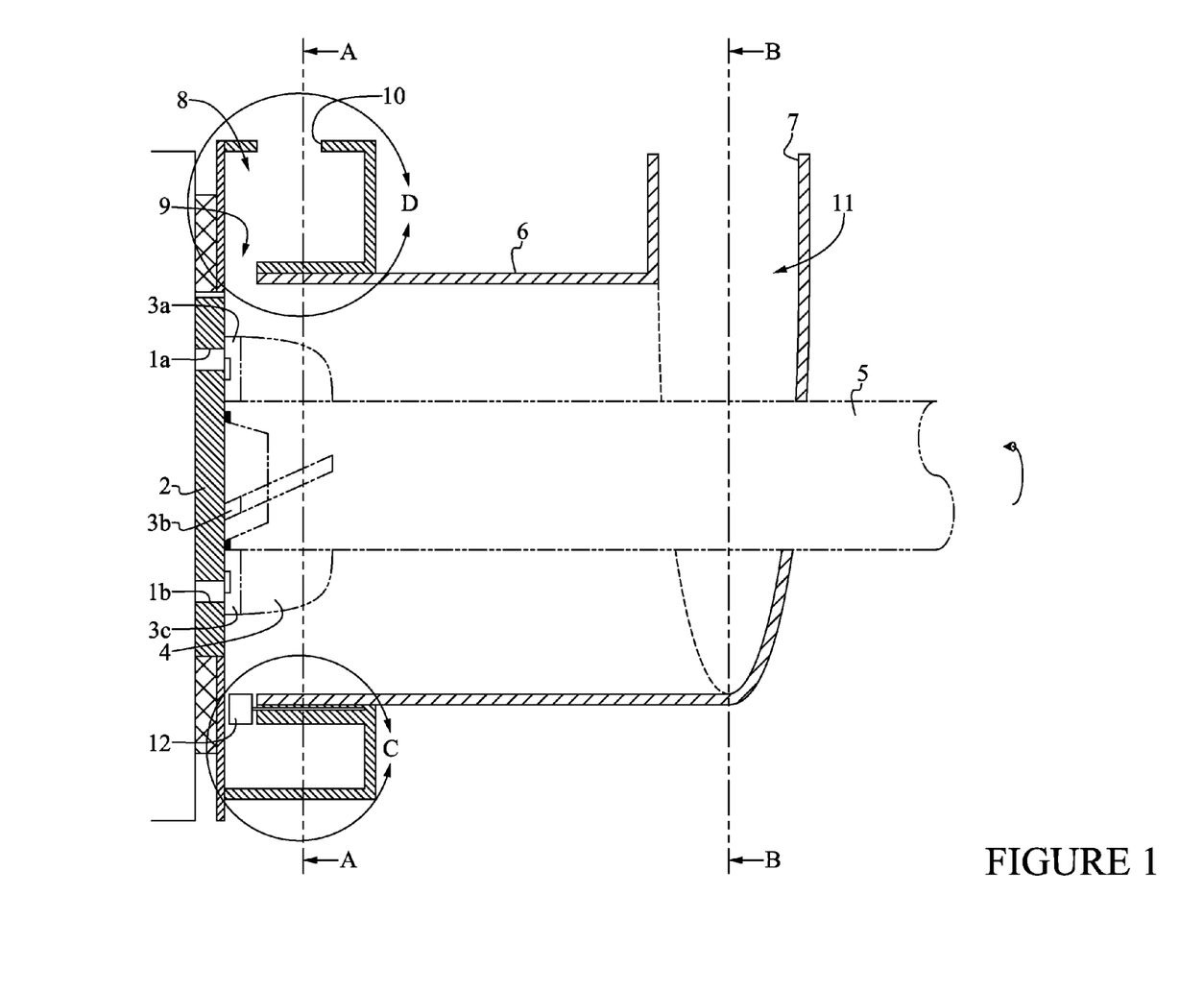
FIG. 1 is a schematic cross-sectional view of a granulating device.

FIG. 1 shows a schematic cross-sectional view of a device or apparatus for granulating thermoplastic material emerging from nozzles in a perforated plate 2.

The granulating device shown schematically in FIG. 1 can have a perforated plate 2 with one or more nozzles (two 1a, 1b) provided therein. The arrangement of the nozzles 1a, 1b is substantially and rotationally symmetric and the remaining design of the device according to the invention is also rotationally symmetric or substantially rotationally symmetric.

Figure 2:
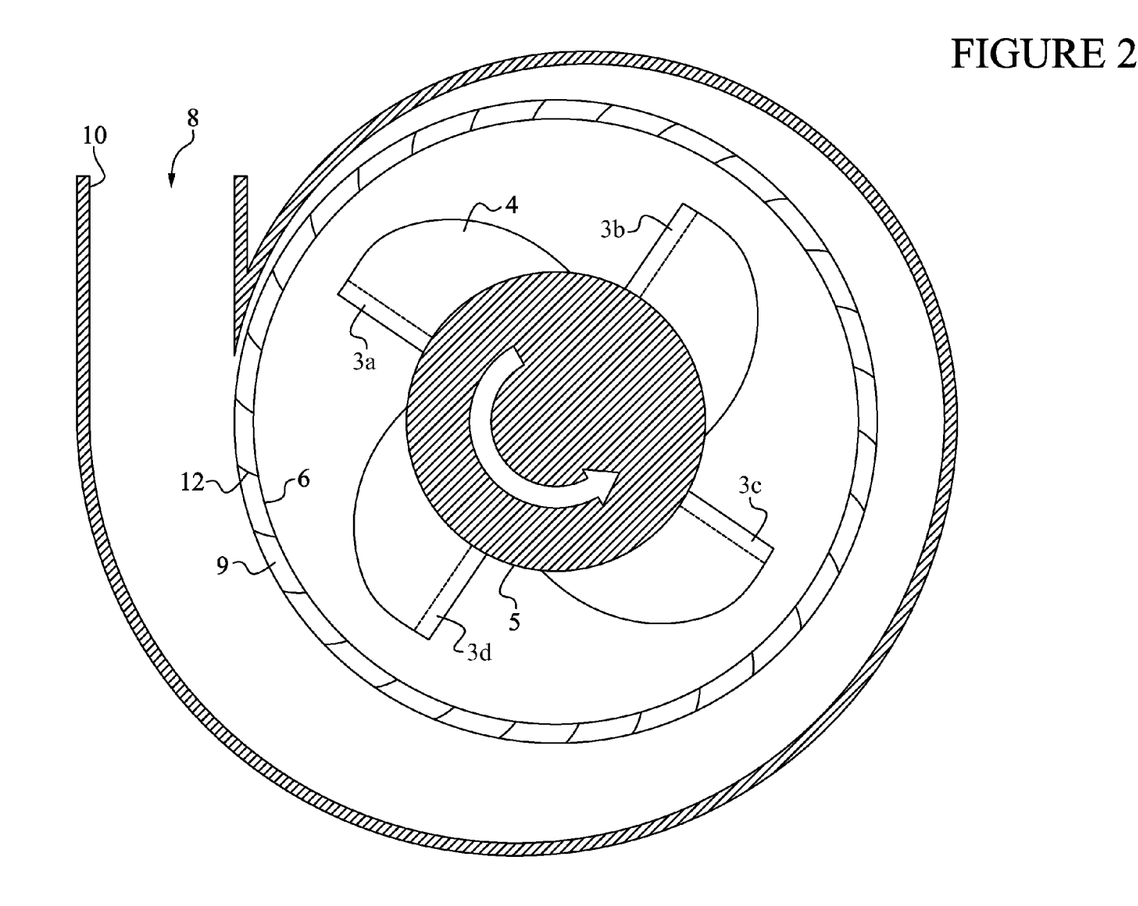
FIG. 2 is a cross-sectional view along line A-A from FIG. 1 of an embodiment.

The perforated plate 2 can be associated with a cutter arrangement with at least one blade 3 (three are shown in FIGS. 1 3a, 3b, and 3c, however, a fourth 3d can be seen in FIG. 2). The cutter arrangement can include a blade carrier 4. The blade carrier 4 can be located on a blade shaft 5.

The cutter arrangement can be driven by a motor (not shown in FIG. 1), so that the blades 3a, 3b, and 3c passes over the nozzles 1a and 1b in the perforated plate 2 and cuts pellets of thermoplastic material emerging from the nozzles 1a and 1b. The thermoplastic material can be melted in a conventional manner and can be transported, for example by an extruder or a melt pump (not shown in FIG. 1), to the area of the perforated plate 2 and forced out of the nozzles 1a and 1b there.

A housing 6 can adjoin the perforated plate 2 and define a cutting chamber. The cutting chamber can be filled with a coolant and have coolant passed therethrough. The housing 6 can enclose the blades 3a, 3b, 3c and the blade carrier 4 as well as at least a portion of the blade shaft 5.

The blade shaft 5 passes out of the housing 6 in the part of the housing 6 that faces away from the perforated plate 2 in a fluid-tight manner.

The apparatus can also include an inlet apparatus. The inlet apparatus can have a separate inlet chamber 8. The separate inlet chamber 8 can circumferentially enclose the housing 6 in the area of rotation of the blades 3a, 3b, 3c. The inlet apparatus can also have an inlet nozzle arrangement 9 extending circumferentially between the inlet chamber 8 and the housing 6. The inlet nozzle arrangement 9 can be a circumferentially extending annular gap nozzle with a nozzle width of, e.g., 3 mm, as depicted in FIG. 1. The inlet nozzle arrangement 9 can be constant. The inlet chamber 8 can have a cross-section that decreases over its circumference, i.e., circumferentially (see also section A-A in FIG. 2 below), in the direction of rotation of the blades 3a, 3b, and 3c, starting from an inlet opening 10 for the coolant in the inlet chamber 8.

Multiple control devices 12 can provide a circumferentially uniform flow rate of coolant flow through the inlet nozzle arrangement 9. Accordingly, the coolant can be introduced into the housing 6 circumferentially from all sides radially inward from the outside, through the inlet nozzle arrangement 9 between the inlet chamber 8 and the housing 6.

The coolant can flow in a centripetal or at least largely centripetal flow in the area of rotation of the blades 3a, 3b, and 3c. The multiple control devices 12 can be arranged such that in the circumferential direction the coolant can flow into all regions of the inlet chamber 8. The multiple control devices 12 can control the flow of the coolant, rather than to divide individual regions over the circumference of the separate inlet chamber 8.

The individual control devices 12 can be distributed evenly over the circumference of the inlet chamber 8 or the inlet nozzle arrangement 9, for example. The fastening of the individual control devices 12 can be stationary, e.g., by welding appropriate control vanes to the walls. The control devices 12 can also be designed to be adjustable individually or, preferably, together, e.g., by a control unit, wherein, e.g., the angle of incidence can be suitably adjustable (best depicted in FIG. 5).

As shown in FIG. 1, an outlet 7 can be located in the region of the housing 6 facing away from the inlet apparatus. An outlet section 11 with a helical shape toward the outlet 7 is provided here, which appropriately guides the flow of the coolant and the pellets contained therein that are flowing out through the outlet 7, permitting a pressure buildup in this region of the housing 6 and in the outlet 7, as a result of the back pressure resulting in the spiral-shaped outlet section 11. A suitable spiral-shaped outlet section can also be used.

FIG. 2 shows a cross-sectional view of an embodiment of the apparatus of FIG. 1 along line A-A in FIG. 1.

In FIG. 2, the cross-section of the inlet chamber 8 can change over the circumference of the housing 6 to become smaller starting from the inlet opening 10 for the coolant in the direction of rotation of the blades 3a, 3b, and 3c, with the inlet chamber 8 being spiral-shaped. The control devices 12 are provided in the region of the inlet nozzle arrangement 9. The control devices 12 can be placed uniformly over the circumference, such as at the same angular separation. The control devices 12 can have a blade profile or a vane shape that is hydrodynamically favorable, which permits guidance of the coolant such that a circumferentially uniform flow rate of coolant flows through the inlet nozzle arrangement 9 into the housing 6.

The direction of rotation of the cutter arrangement with the blade shaft 5, the blade carriers 4, and the blade 3a, 3b, 3c, and 3d located thereon is indicated in FIG. 2 by the rotation arrow.

Figure 3:
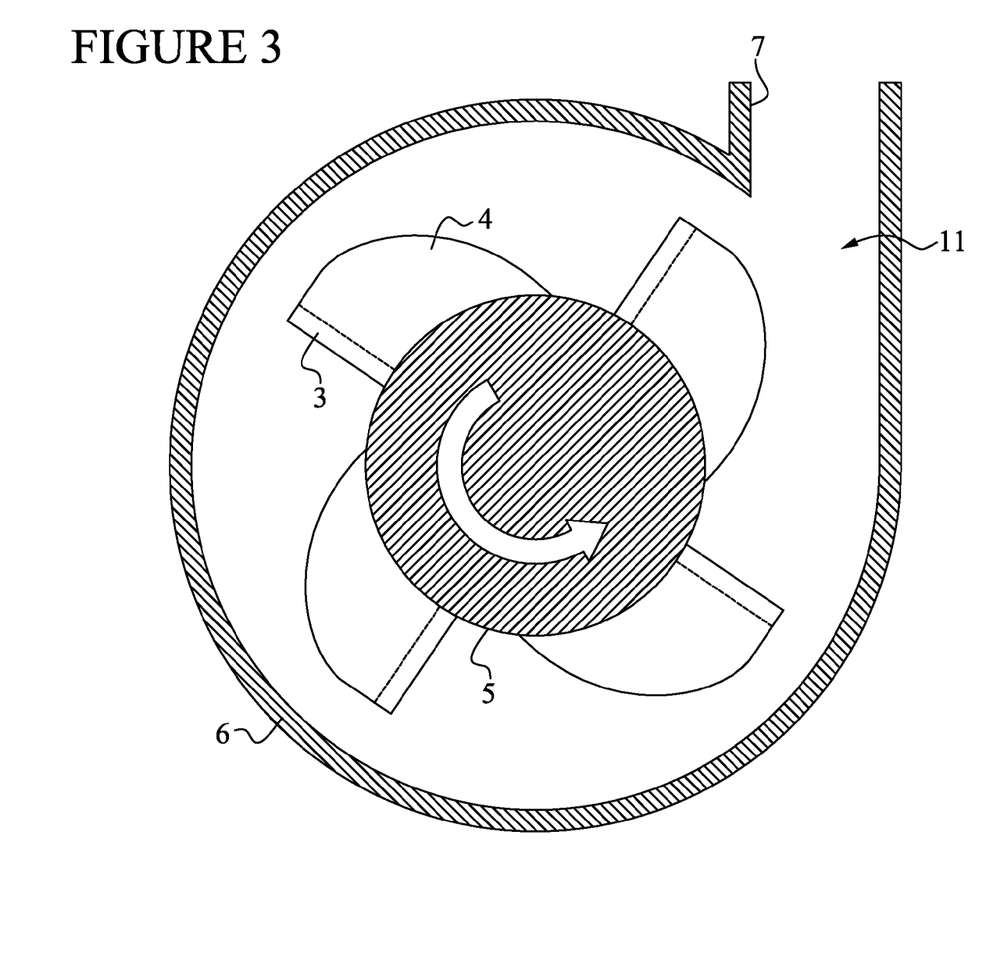
FIG. 3 is a cross-sectional view along line B-B from FIG. 1 of an embodiment.

FIG. 3 shows a cross-sectional view along line B-B from FIG. 1 according to a first embodiment of the apparatus.

Visible in FIG. 3 is the cross-sectional view along line B-B from FIG. 1 in the region of the outlet 7 from the housing 6 of the inventive device. The outlet 7 is shown as tangentially arranged. In this context, the outlet section 11, shown in FIG. 3 as shaped in a helix toward the outlet 7, serves the purpose of flow-optimized discharge of the coolant and the pellets contained therein.

Figure 4:
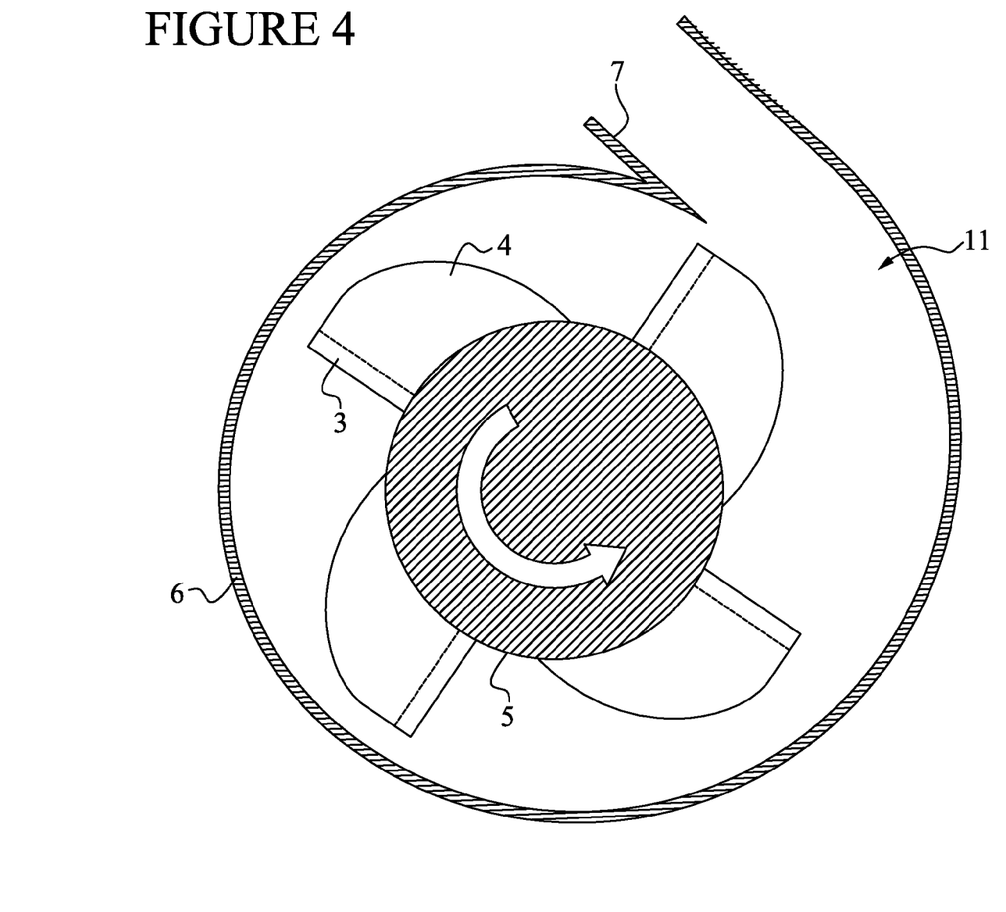
FIG. 4 is a cross-sectional view along line B-B from FIG. 1 of another embodiment.

FIG. 4 shows a cross-sectional view along line B-B from FIG. 1 according to a second embodiment of the invention.

Visible in FIG. 4 is the cross-sectional view along line B-B from FIG. 1 in the region of the outlet 7 from the housing 6 of the inventive device. The outlet 7 is shown as spiral-shaped. The outlet section 11 is shown as a spiral shape whose radius increases over the circumference toward the outlet 7 and can allow for a flow-optimized discharge of the coolant and the pellets contained therein.

Figure 5:
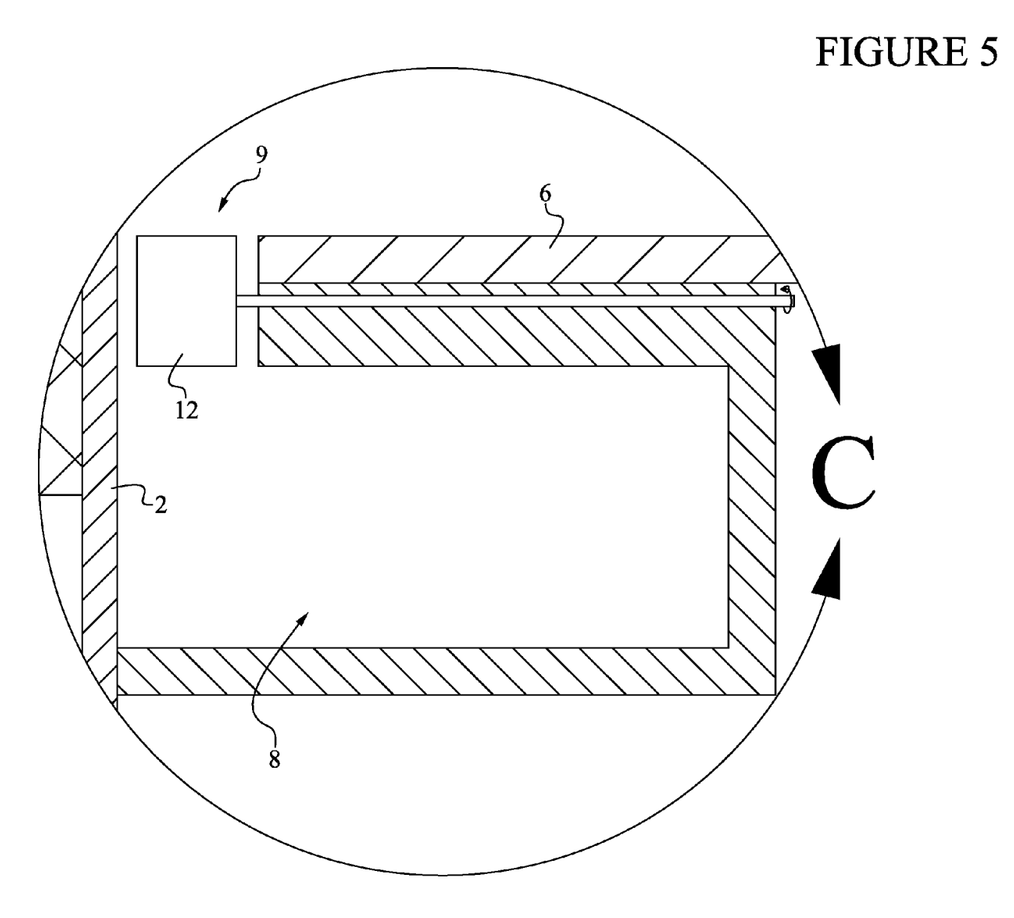
FIG. 5 is an enlarged, schematic cross-sectional view of a detail "C" from FIG. 1.

FIG. 5 shows an enlarged, schematic cross-sectional view of a detail "C" from FIG. 1 in the region of the inlet nozzle arrangement 9. The arrangement of one of the control devices 12 in the inlet nozzle arrangement 9 is shown between the perforated plate 2 and the housing 6. The control device 12, as is the case for the other control devices 12 not visible in FIG. 5, can be rotated, e.g. by means of an axis of rotation, by the control unit or by a suitably controlled actuating drive (not shown in FIG. 5), as is indicated by the corresponding double arrow in FIG. 5. The inflow rate and/or inflow direction of the coolant can be adjusted by this means.

Figure 6:
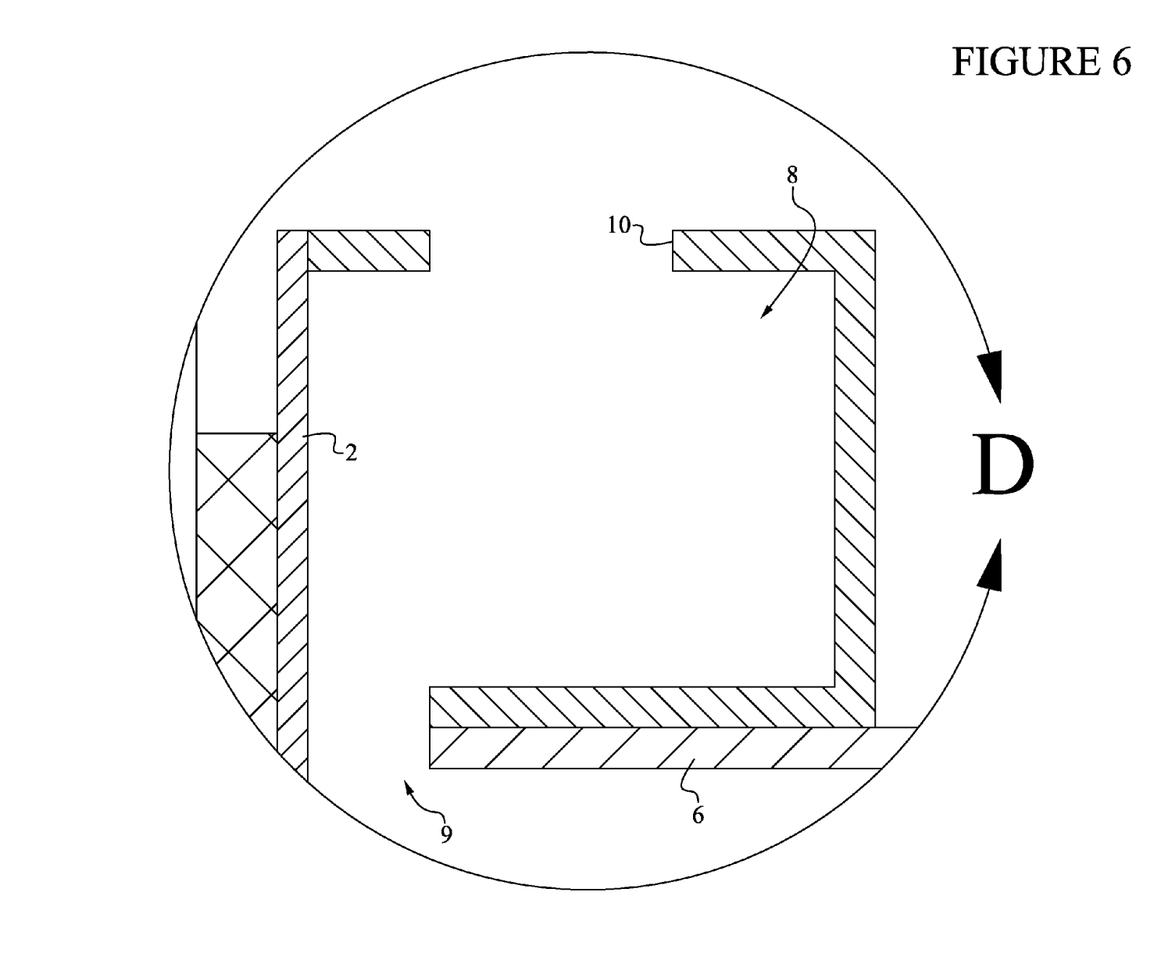
FIG. 6 is an enlarged, schematic cross-sectional view of a detail "D" from FIG. 1.

FIG. 6 shows an enlarged, schematic cross-sectional view of a detail "D" from FIG. 1 in the region of the inlet nozzle arrangement 9 and the inlet opening 10 for the coolant. Here, none of the control devices are shown arranged in the region of the inlet nozzle arrangement 9. In general, an embodiment of the inventive granulator can be provided, which has no control devices over the entire circumference in the region of the inlet nozzle arrangement 9.

Figure 7:
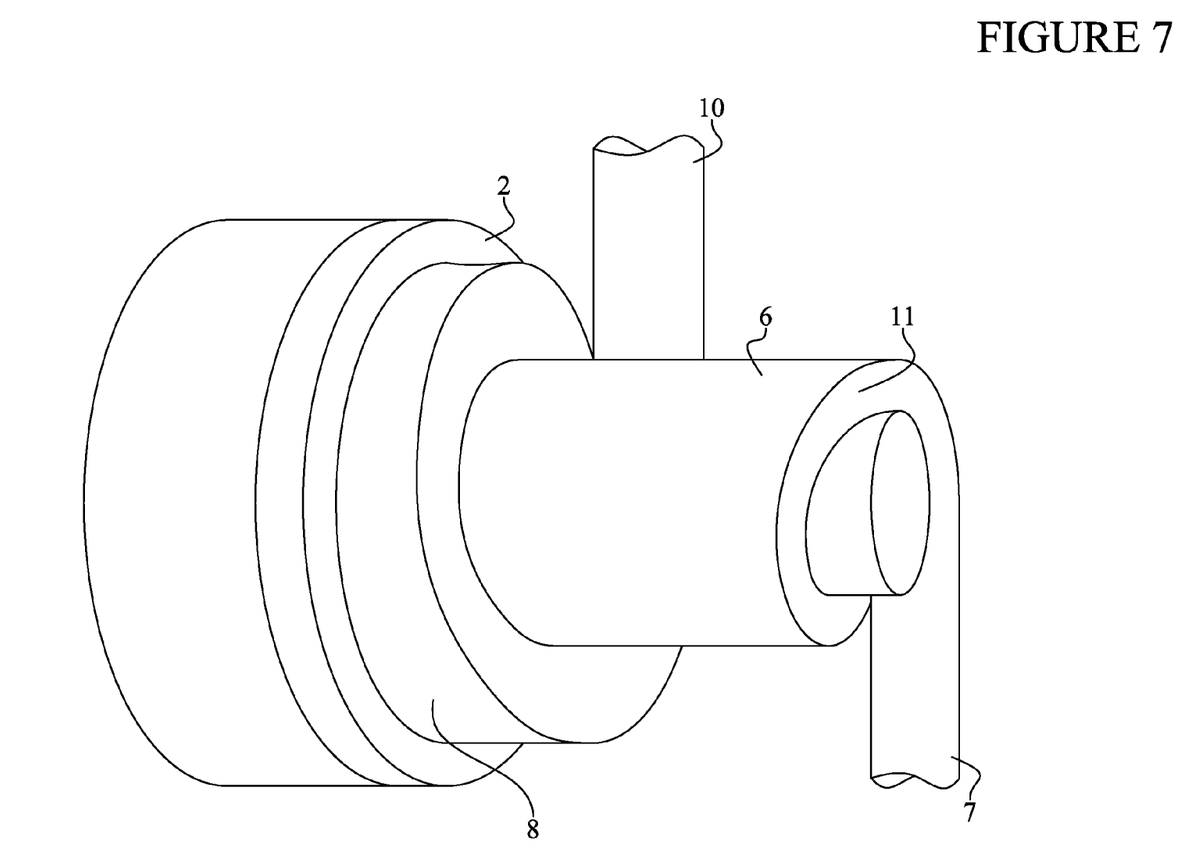
FIG. 7 is a perspective view of a granulating device.

FIG. 7 shows a schematic, perspective view of a granulating device according to the invention, wherein the coolant can be introduced into the housing 6 through the inlet opening 10 and the separate spiral-shaped inlet chamber 8, whose cross-section decreases over its circumference starting from the inlet opening 10 in the direction of rotation of the cutter arrangement. The coolant can be introduced circumferentially from all sides radially inward from the outside or essentially radially inward from the outside. A centripetal or at least largely centripetal flow of the coolant can be produced at least in the area of rotation of the at least one blade of the cutter arrangement (not shown in FIG. 7). It should be noted that the arrangement of inlet opening 10, outlet 7, and outlet section 11, as well as the direction of rotation of the cutter arrangement, do not exactly correspond to the arrangement such as is shown in FIG. 1. Instead, these are depicted as partially reversed side-to-side with respect thereto for reasons of improved perspective representation.

The devices described herein can be used to perform one or more embodiments of the method.

While these embodiments have been described with emphasis on the embodiments, it should be understood that within the scope of the appended claims, the embodiments might be practiced other than as specifically described herein.

What is claimed is:

1. A device for granulating thermoplastic material emerging from nozzles in a perforated plate comprising:
   a. a motor-driven cutter arrangement that has at least one blade located opposite the perforated plate, so that the at least one blade passes over the nozzles in the perforated plate and cuts pellets of the emerging thermoplastic material;
   b. a housing adjoining the perforated plate and enclosing the at least one blade of the motor-driven cutter arrangement, wherein the housing comprises:
      (i) an inlet apparatus for coolant comprising:
         1. a separate inlet chamber circumferentially enclosing the housing in an area of rotation of the at least one blade, wherein a discharge opening for the coolant is formed through a portion of the separate inlet chamber, and wherein a cross-section of the separate inlet chamber decreases over its circumference in the direction of rotation of the at least one blade starting from the discharge opening, wherein the separate inlet chamber is configured so that the coolant flows essentially radially inward from outside into the housing from all sides, and continues to flow through the area of rotation of the at least one blade in at least a substantially centripetal direction; and
         2. an inlet nozzle arrangement circumferentially extending between the separate inlet chamber and the housing; and
      (ii) an outlet for the coolant and the pellets located therein.

2. The device of claim 1, wherein the separate inlet chamber is spiral-shaped.

3. The device of claim 1, wherein the inlet nozzle arrangement is an annular gap nozzle that has a nozzle width in the range from 1 mm to 8 mm.

4. The device of claim 1, wherein the inlet nozzle arrangement is composed of multiple circumferentially distributed nozzle openings, each of which has a nozzle width in the range from 1 mm to 8 mm.

5. A device for granulating thermoplastic material emerging from nozzles in a perforated plate comprising:
   a. a motor-driven cutter arrangement that has at least one blade located opposite the perforated plate, so that the at least one blade passes over the nozzles in the perforated plate and cuts pellets of the emerging thermoplastic material;
   b. a housing that adjoins the perforated plate and encloses the at least one blade of the motor-driven cutter arrangement, wherein the housing comprises:
      (i) an inlet apparatus for coolant comprising:
         1. a separate inlet chamber circumferentially enclosing the housing in an area of rotation of the at least one blade, wherein a discharge opening for the coolant is formed through a portion of the separate inlet chamber, and wherein a cross-section of the separate inlet chamber decreases over its circumference in the direction of rotation of the at least one blade starting from the discharge opening, wherein the separate inlet chamber is configured so that the coolant flows essentially radially inward from outside into the housing from all sides, and continues to flow through the area of rotation of the at least one blade in at least a substantially centripetal direction; and 2. an inlet nozzle arrangement extending circumferentially between the separate inlet chamber and the housing;
   (ii) an outlet for the coolant and the pellets located therein; and
c. a control device disposed in an area of the inlet nozzle arrangement to change the shape of the inlet nozzle to provide a flow rate of coolant that is circumferentially uniform through the inlet nozzle arrangement.

6. The device of claim 5, wherein the control device is adjustable, so as to adjust the circumferentially uniform flow rate of coolant throughout the inlet nozzle arrangement.

7. The device of claim 5, wherein the inlet nozzle arrangement is an annular gap nozzle with a nozzle width in the range from 1 mm to 8 mm.

8. The device of claim 5, wherein the inlet nozzle arrangement is composed of multiple circumferentially distributed nozzle openings, wherein each nozzle opening has a nozzle width within the range from 1 mm to 8 mm.

9. The device of claim 5, wherein the inlet nozzle arrangement has a nozzle width that is constant.

10. The device of claim 5, wherein the inlet nozzle arrangement is adjustable in its nozzle width.

11. The device of claim 5, wherein a control unit is provided, and wherein the control unit controls the pressure, the flow rate, or combinations thereof of the coolant supplied through an opening in the inlet nozzle arrangement.

12. The device of claim 5, wherein the outlet is located in a region of the housing that faces away from the inlet apparatus.

13. The device of claim 5, wherein the outlet tangentially extends from the housing.

14. The device of claim 5, wherein the outlet is shaped as a spiral, and
   wherein the pellets contained therein are arranged in a region of the housing that faces away from the inlet apparatus.

15. The device of claim 5, wherein the outlet is shaped as a helix, and wherein the pellets contained therein are arranged in a region of the housing that faces away from the inlet apparatus.

* * * * *